(12) United States Patent
Semeco

(10) Patent No.: US 10,078,375 B2
(45) Date of Patent: Sep. 18, 2018

(54) MULTILINGUAL KEYBOARD

(71) Applicant: Maria Daniela Semeco, Berkeley, CA (US)

(72) Inventor: Maria Daniela Semeco, Berkeley, CA (US)

(73) Assignee: Polyglotte Inc., San Francisco, CA (US)

( * ) Notice: Subject to any disclaimer, the term of this patent is extended or adjusted under 35 U.S.C. 154(b) by 0 days.

(21) Appl. No.: 14/648,601

(22) PCT Filed: Dec. 2, 2013

(86) PCT No.: PCT/US2013/072672
§ 371 (c)(1),
(2) Date: May 29, 2015

(87) PCT Pub. No.: WO2014/085822
PCT Pub. Date: Jun. 5, 2014

(65) Prior Publication Data
US 2015/0309591 A1 Oct. 29, 2015

Related U.S. Application Data

(60) Provisional application No. 61/732,195, filed on Nov. 30, 2012, provisional application No. 61/835,417, filed on Jun. 14, 2013.

(51) Int. Cl.
*G06F 3/023* (2006.01)
*G06F 3/01* (2006.01)
(Continued)

(52) U.S. Cl.
CPC ............ *G06F 3/0233* (2013.01); *G06F 3/018* (2013.01); *G06F 17/275* (2013.01); *G06F 3/04886* (2013.01); *H04M 2250/70* (2013.01)

(58) Field of Classification Search
CPC .......... G06F 3/02; G06F 3/0219; G06F 3/0233
See application file for complete search history.

(56) References Cited

U.S. PATENT DOCUMENTS 3,945,482 A * 3/1976 Einbinder ............. G06F 3/0219
400/109
4,204,089 A 5/1980 Key et al.
(Continued)

FOREIGN PATENT DOCUMENTS

AU 2004100974 B4 1/2005

OTHER PUBLICATIONS

European Search Report for Application No. 13859413.0, dated Jul. 16, 2016, 11 pages.
(Continued)

*Primary Examiner* — Lixi C Simpson
(74) *Attorney, Agent, or Firm* — Morgan, Lewis & Bockius LLP

(57) ABSTRACT

A diacritic chording system uses a single standard keyboard layout to generate diacritical characters used, for example, by Latin-based languages or languages based on a Roman character set, providing a universal keyboard. The key combination required to select a diacritic is consistent, independent of the language the user is typing. The diacritic chording system uses chording to obtain characters modified by diacritics, i.e., diacritical characters. The key combinations in the diacritic chord are chosen in such a way to aid memorization by positional association of the keys or by logic association of the keys within the diacritic chord. The use of a combination of positional association and logical association eliminates conflicts in mapping diacritics for different languages. The diacritic chording system also provides a screen overlay as a mnemonic to illustrate which diacritic chords provide the desired diacritical character.

11 Claims, 21 Drawing Sheets

(51) Int. Cl.
*G06F 17/27* (2006.01)
*G06F 3/0488* (2013.01)

(56) References Cited

U.S. PATENT DOCUMENTS

| | | | |
|---|---|---|---|
| 5,870,074 | A | 2/1999 | Iwasaki |
| 6,340,937 | B1 | 1/2002 | Stepita-Klauco |
| 6,927,774 | B2 | 8/2005 | Yano |
| 7,595,742 | B2 | 9/2009 | Cozzi et al. |
| 8,228,211 | B2 | 7/2012 | Gabay |
| 2005/0017955 | A1* | 1/2005 | Jayachandra .......... G06F 3/018 345/171 |
| 2006/0100848 | A1* | 5/2006 | Cozzi ................. G06F 17/2223 704/5 |
| 2011/0202839 | A1* | 8/2011 | AlKazi ................ G06F 3/0233 715/703 |
| 2011/0280641 | A1* | 11/2011 | Jiang .................... G06F 3/0213 400/486 |

OTHER PUBLICATIONS

Several Authors (Wikipedia), "SFS 5966," Retrieved from the Internet: http://web.archive.org/web/20120130032454/http//fi.wikipedia.org/wiki/SFS_5966 [retrieved on Jul. 7, 2016].

\* cited by examiner

FIG. 4 alt gr symbols

| Symbol | Unicode |
|---|---|
| ¹ | 00B9 |
| ² | 00B2 |
| ³ | 00B3 |
| § | 00A7 |
| ¦ | 00A6 |
| ¬ | 00AC |
| ± | 00B1 |
| º | 00B0 |
| µ | 00B5 |
| ª | 00AA |
| £ | 00A3 |
| ¤ | 00A4 |
| İ | 0130 |

FIG. 5A

*Czech*

| Symbol | Unicode | Construction |
|---|---|---|
| á | 00E1 | ′ + a |
| č | 010D | ↓shift + ^ + c |
| ď | 010F | ′ + d |
| é | 00E9 | ′ + e |
| ě | 011B | ↓shift + ^ + e |
| í | 00ED | ′ + i |
| ň | 0148 | ↓shift + ^ + n |
| ó | 00F3 | ′ + o |
| ř | 0159 | ↓shift + ^ + r |
| š | 0161 | ↓shift + ^ + s |
| ť | 0165 | ′ + t |
| ú | 00FA | ′ + u |
| ů | 016F | alt gr + ° + u |
| ý | 00FD | ′ + y |
| ž | 017E | ↓shift + ^ + z |

*Danish*

| Symbol | Unicode | Construction |
|---|---|---|
| å | 00E5 | alt gr + ° + a |
| æ | 00E6 | a + e |
| é | 00E9 | ′ + e |
| ø | 00F8 | / + o |

*Dutch*

| Symbol | Unicode | Construction |
|---|---|---|
| é | 00E9 | ′ + e |
| ë | 00EB | ¨ + e |
| ï | 00EF | ¨ + i |
| ó | 00F3 | ′ + o |
| ö | 00F6 | ¨ + o |
| ü | 00FC | ¨ + u |

*English*

None

FIG. 5B

*Esperanto*

| Symbol | Unicode | Construction |
|---|---|---|
| ĉ | 0109 | ^ + c |
| ĝ | 011D | ^ + g |
| ĥ | 0125 | ^ + h |
| ĵ | 0135 | ^ + j |
| ŝ | 015D | ^ + s |
| ŭ | 016D | ˇ + u |

*Finnish*

| Symbol | Unicode | Construction |
|---|---|---|
| ä | 00E4 | ¨ + a |
| å | 00E5 | alt gr + ° + a |
| ö | 00F6 | ¨ + o |

*French*

| Symbol | Unicode | Construction |
|---|---|---|
| à | 00E0 | ` + a |
| â | 00E2 | ^ + a |
| æ | 00E6 | a + e |
| ç | 00E7 | , + c |
| é | 00E9 | ´ + e |
| ê | 00EA | ^ + e |
| ë | 00EB | ¨ + e |
| ï | 00EF | ¨ + i |
| î | 00EE | ^ + i |
| ô | 00F4 | ^ + o |
| œ | 0153 | o + e |
| ù | 00F9 | ` + u |
| û | 00FB | ^ + u |
| ü | 00FC | ¨ + u |
| ÿ | 00FF | ¨ + y |

*German*

| Symbol | Unicode | Construction |
|---|---|---|
| ä | 00E4 | ¨ + a |
| ö | 00F6 | ¨ + o |
| ü | 00FC | ¨ + u |
| ß | 00DF | ß |

FIG. 5C

*Hungarian*

| Symbol | Unicode | Construction |
|---|---|---|
| á | 00E1 | ´ + a |
| é | 00E9 | ´ + e |
| í | 00ED | ´ + i |
| ö | 00F6 | ¨ + o |
| ó | 00F3 | ´ + o |
| ő | 0151 | ´ + ´ + o |
| ü | 00FC | ¨ + u |
| ú | 00FA | ´ + u |
| ű | 0171 | ´ + ´ + u |

*Italian*

| Symbol | Unicode | Construction |
|---|---|---|
| à | 00E0 | ` + a |
| è | 00E8 | ` + e |
| é | 00E9 | ´ + e |
| ì | 00EC | ` + i |
| ò | 00F2 | ` + o |
| ó | 00F3 | ´ + o |

*Luxembourgish*

| Symbol | Unicode | Construction |
|---|---|---|
| ä | 00E4 | ¨ + a |
| ë | 00EB | ¨ + e |
| é | 00E9 | ´ + e |

*Polish*

| Symbol | Unicode | Construction |
|---|---|---|
| ą | 0105 | , + a |
| ć | 0107 | ´ + c |
| ę | 0119 | , + e |
| ł | 0142 | / + l |
| ń | 0144 | ´ + n |
| ó | 00F3 | ´ + o |
| ś | 015B | ´ + s |
| ź | 017A | ´ + z |
| ż | 017C | ↓shift + , + z |

FIG. 5D

*Portuguese*

| Symbol | Unicode | Construction |
|---|---|---|
| ã | 00E3 | ~ + a |
| á | 00E1 | ´ + a |
| â | 00E2 | ^ + a |
| à | 00E0 | ` + a |
| ç | 00E7 | ， + c |
| é | 00E9 | ´ + e |
| ê | 00EA | ^ + e |
| í | 00ED | ´ + i |
| õ | 00F5 | ~ + o |
| ó | 00F3 | ´ + o |
| ô | 00F4 | ^ + o |
| ú | 00FA | ´ + u |
| ü | 00FC | ¨ + u |

*Romanian*

| Symbol | Unicode | Construction |
|---|---|---|
| ă | 0103 | ˘ + a |
| â | 00E2 | ^ + a |
| î | 00EE | ^ + i |
| ş | 015F | ， + s |
| ţ | 0163 | ， + t |
| ț | 021B | ↓shift + ´ + t |

*Spanish*

| Symbol | Unicode | Construction |
|---|---|---|
| á | 00E1 | ´ + a |
| é | 00E9 | ´ + e |
| í | 00ED | ´ + i |
| ñ | 00F1 | ~ + n |
| ó | 00F3 | ´ + o |
| ú | 00FA | ´ + u |
| ü | 00FC | ¨ + u |
| ¿ | 00BF | ↓shift + ? |
| ¡ | 00A1 | ↓shift + ! |

FIG. 5E

*Swedish*

| Symbol | Unicode | Construction |
|---|---|---|
| ä | 00E4 | ¨ + a |
| å | 00E5 | alt gr + ° + a |
| é | 00E9 | ´ + e |
| ö | 00F6 | ¨ + o |

*Turkish*

| Symbol | Unicode | Construction |
|---|---|---|
| ç | 00E7 | ‚ + c |
| ğ | 011F | ˘ + g |
| ı | 0131 | ı |
| İ | 0130 | alt gr + I |
| ö | 00F6 | ¨ + o |
| ş | 015F | ‚ + s |
| ü | 00FC | ¨ + u |

FIG. 5F

*Welsh*

| Symbol | Unicode | Construction |
|---|---|---|
| â | 00E2 | ^ + a |
| ä | 00E4 | ¨ + a |
| á | 00E1 | ´ + a |
| à | 00E0 | ` + a |
| ê | 00EA | ^ + e |
| ë | 00EB | ¨ + e |
| é | 00E9 | ´ + e |
| è | 00E8 | ` + e |
| î | 00EE | ^ + i |
| ï | 00EF | ¨ + i |
| í | 00ED | ´ + i |
| ì | 00EC | ` + i |
| ô | 00F4 | ^ + o |
| ö | 00F6 | ¨ + o |
| ó | 00F3 | ´ + o |
| ò | 00F2 | ` + o |
| û | 00FB | ^ + u |
| ü | 00FC | ¨ + u |
| ú | 00FA | ´ + u |
| ù | 00F9 | ` + u |
| ŵ | 0175 | ^ + w |
| ẅ | 1E85 | ¨ + w |
| ẃ | 1E83 | ´ + w |
| ẁ | 1E81 | ` + w |
| ŷ | 0177 | ^ + y |
| ÿ | 00FF | ¨ + y |
| ý | 00FD | ´ + y |
| ỳ | 1EF3 | ` + y |

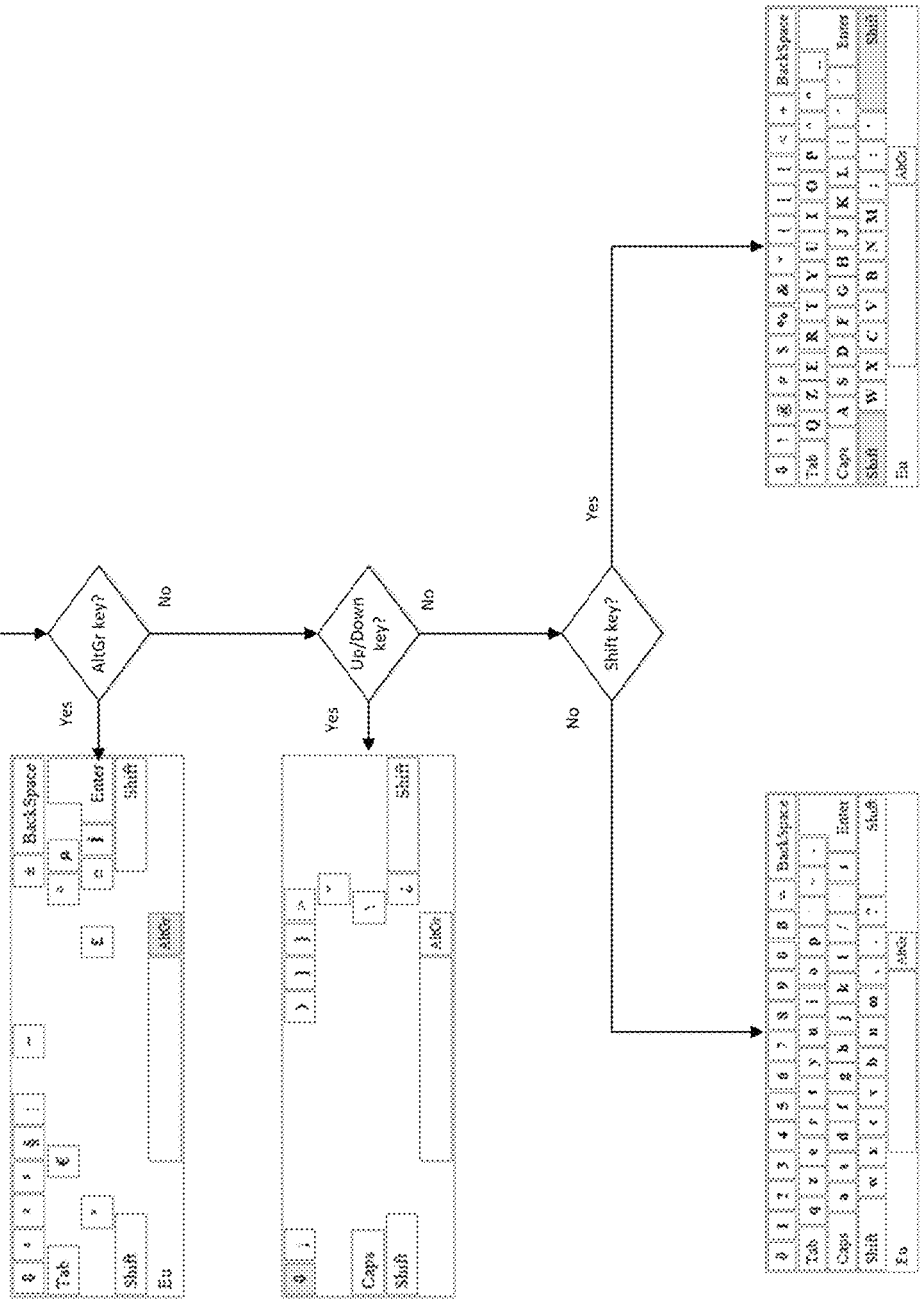

FIG. 11

NON-SHIFT STATE

LEGEND:

- NON-SHIFT STATE
- CHARACTER ABOVE – HOLD DOWN TO SELECT → SLIDE FINGER UPWARDS
- ↓ SHIFT STATE

MULTILINGUAL KEYBOARD

CROSS-REFERENCE TO RELATED APPLICATION

This application is a National Stage of International Patent Application No. PCT/US2013/072672 filed Dec. 2, 2013 and published as WO 2014/085822 A2, which claims priority to U.S. Provisional Applications No. 61/732,195 filed Nov. 30, 2012 and 61/835,417 filed Jun. 14, 2013, the entire contents of which applications is incorporated herein for all purposes by this reference.

FIELD OF THE INVENTION

The present invention generally relates to a method for generating specialty characters from a generic keyboard, and in particular to generating diacritics used by languages, such as European languages. More specifically, the present invention provides a method for generating diacritics required for many different languages from a universal keyboard.

BACKGROUND OF THE INVENTION

Current keyboards are primarily used for data entry and are specifically designed for specific languages. As an example, U.S. English keyboards lack numerous accents, dieresis, cedillas and other diacritical marks (collectively referred to herein as diacritics) that are necessary to correctly type non-English languages. A character utilizing a diacritic is referenced herein as a diacritical character. In the increasingly global marketplace, a native of a country fluent in several languages may be working in the U.S. This person could find it difficult to communicate fluently in a European language because the U.S. keyboard has a limited number of diacritics available to the user.

A conventional approach to providing diacritics essential to a language is to utilize "national keyboards" that generate language specific accented characters. Typically, commonly used diacritical characters are assigned a unique key on the keyboard. Thus, for example, it is common to find the diacritical character "ñ" on a Spanish keyboard but not on a French keyboard since the "tilde" is not used in the French language. Similarly, the diacritical characters "à", "ć" and "ù" are found on most French keyboards but not on Spanish keyboards while the diacritical characters "ä", "ö" and "ü" are found on German keyboards. However, each keyboard is designed primarily for one language. Persons who write in more than one language are required to either switch keyboards and use a different keyboard driver application tailored to the desired language, or improvise to generate the desired diacritic.

One problem arising from the use of national keyboards is that even though two keyboards may contain the same characters, their positions may be quite different. Thus, the position of the acute and grave accents on a keyboard designed for France is different from that of a keyboard design for Italy. Switching keyboards requires the user to remember different keyboard layouts, a complication that potentially slows keyboarding by the user. Further, switching keyboards requires additional keyboard driver applications as the placement of characters on the keyboard is different.

Conventional word processing applications make use of so-called "dead keys" to obviate the need for backspacing while entering accented characters that are not assigned a unique key. It will be appreciated that the keyboard would be much too large if every possible accented character were assigned a unique key. With a dead key, the operator initially selects the dead key appropriate to the required diacritic and then selects the appropriate character key to produce a diacritical character. This dead key enters the accent but does not advance the display. Reference is made to U.S. Pat. No. 4,204,089.

Only a few characters can be assigned to the dead keys, while over twenty-five different diacritical modifiers are required for European languages. In addition, some European characters use diacritics that are not modifications of existing characters but unique characters on their own. Consequently, these diacritical characters do not translate well to a "dead key" approach.

Another conventional approach to generating diacritics is to use a compose key. A key on a keyboard is designated as a "compose" key. Pressing the compose key and then a sequence of keys causes a keyboard driver application to interpret the sequence of two or three characters as a composition: However, the user is required to remember many different combinations to produce the desired diacritical character, slowing the keyboard entry speed of the user.

Yet another conventional approach utilizes a repetition method. A user repeatedly presses a key to cycle through possible diacritics for the desired diacritical character. For example, one press of the letter "a" yields "a". A second press of the letter "a" yields "á". A third press of the letter "a" yields "à". A fourth press of the letter "a" yields "ä", etc. (Reference is made to U.S. Pat. No. 6,340,937.) However, the user is required to either remember where in the cycle the desired character is produced or focus on the keyboard and screen when cycling through the possible characters. This approach also slows keyboard entry speed of the user.

What is therefore needed is a system, a computer product, and an associated method that allow the use of a single keyboard (or an input keypad) to produce diacritics for different languages that use, for example, a Latin-based character set or a Roman character set. Further, a method is needed that allows a user of a U.S. keyboard to generate properly shaped diacritics in other languages in a user-friendly format. The need for such system and method has heretofore remained unsatisfied.

BRIEF SUMMARY OF THE INVENTION

The present invention satisfies this need, and presents a system, a computer program product, and an associated method (collectively referred to herein as "the system" or "the present system") for using a standard keyboard such as a U.S. keyboard to conveniently generate diacritical characters used by Latin-based languages or languages based on a Roman character set. The present system allows users to type in many different languages from one keyboard layout, providing a universal keyboard for all languages using a Latin-based character set or a Roman character set. The key combination required to select a diacritic is consistent, independent of the language the user is typing.

In various embodiments, the invention provides a system for adapting a keyboard display to a definable input language. An exemplary system includes an adaptable keyboard comprising keys; a software application, operatively associated with the adaptable keyboard; and a computerized system enabled to receive data from the adaptable keyboard, process and present data and operate the application. The adaptable keyboard includes a key referred to an "inverse shift key", whose function is to invert the character corresponding to a key struck concurrently with the inverse shift key. Thus, for example, when the inverse shift key and the comma key are pressed simultaneously or concurrently, the comma becomes an apostrophe. Similarly, when the inverse shift key and the question mark are pressed concurrently, the resulting symbol is the interrogative punctuation mark of Spanish. In another example, an open parenthesis will close.

The inverse shift key functions to render selected keys of the adaptable keyboard language adaptable. The system also includes a screen or other display means upon which the characters entered are presented. The software application enables defining a language and adapting the presentation of each character in the screen according to the defined language, by controlling the display in the screens.

The present system uses, for example, the normal U.S. QZERTY keyboard.

The present invention provides the advantage that the user, rather than memorizing an unrelated key combination, can remember the required diacritic key by simply looking at the keyboard layout and applying the inverse shift key where appropriate. By building on existing keyboarding skills, the user can easily extend keyboarding capability to encompass a large number of diacritic characters.

In various embodiments, the present system provides a dialogue or a help screen overlay as a mnemonic to illustrate which keys provide the desired diacritical character. In this manner, a user can quickly learn the keys that produce diacritical characters for different languages.

The principles and uses of the teachings of the present invention may be better understood with reference to the accompanying description, figures and examples. It is to be understood that the details set forth herein do not construe a limitation to an application of the invention. Furthermore, it is to be understood that the invention can be carried out or practiced in various ways and that the invention can be implemented in embodiments other than the ones outlined in the description above.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

FIG. 4 is a table showing the European keyboard alt gr symbols.

FIGS. 5A-5F are tables showing European keyboard special characters in several languages.

FIG. 7 is a flow diagram illustrating the operation of an exemplary keyboard of the invention.

FIG. 11 illustrates the present invention installed on a mobile device/smartphone after the upside-down shift key has been touched. As a result, this screen appears with the all existing upside-down characters that the user can then select.

First, the user will either type a 'dead key' or not.

If the user types the letter 'l' for example, an 'l' will appear.

If the user presses a 'dead key' (e.g. '''), then that dead key will be activated, but it will not appear right away.

Next, if the user presses the 'space bar', the diacritic will appear on its own: '''.

If instead, the user presses a key that is meant to combine with the previously activated dead key, the composed character will appear. (e.g. '''+'a'='á').

If the user presses a key with a letter that isn't meant to combine with the previously activated dead key, then the most recently typed character will appear. (e.g. '''+'l'='l').

Figure 1:
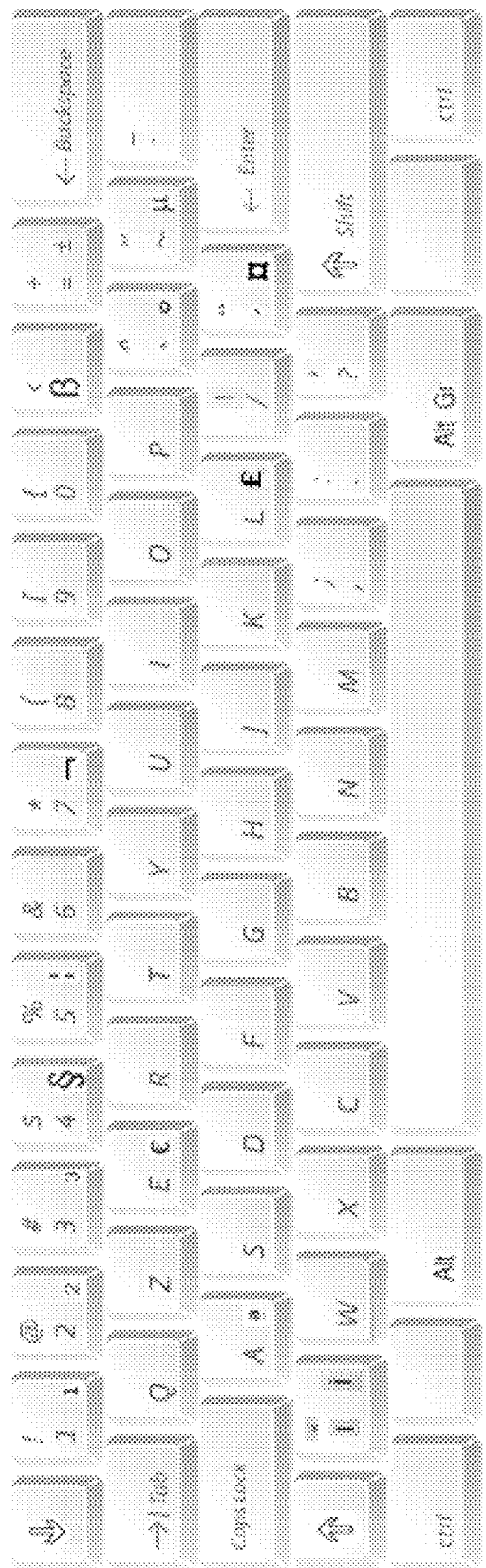
FIG. 1 is a perspective view of a European keyboard system according to the present invention, shown installed upon a conventional personal computer. In the above left-hand corner, the key with the downward facing arrow represents the upside-down shift key.
Figure 2:
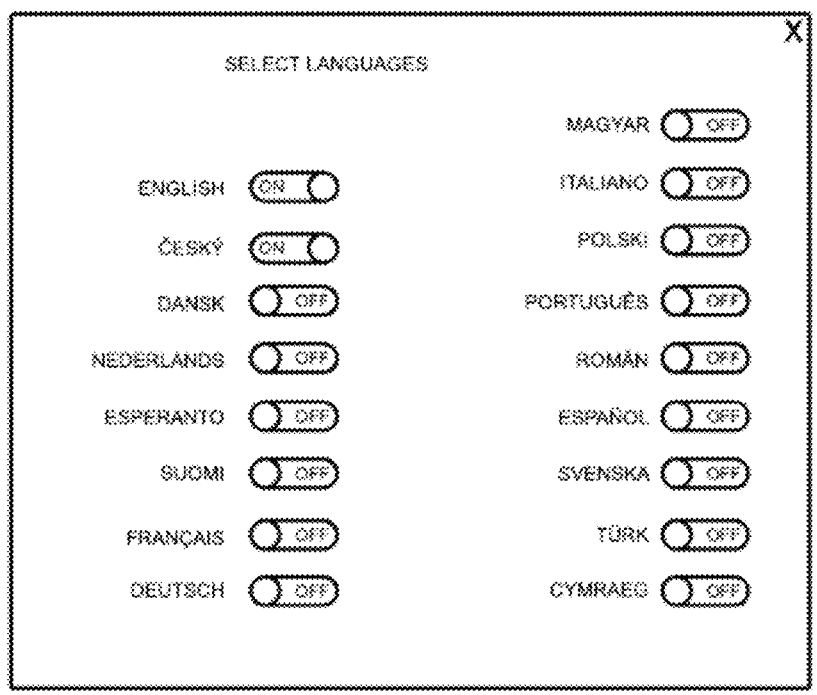
FIG. 2 is a perspective view of a European keyboard dialogue box according to the present invention, shown installed upon a conventional personal computer. Symbols include those of the unified languages' writing systems as well as arrows: ↑↓←→.
Figure 3:
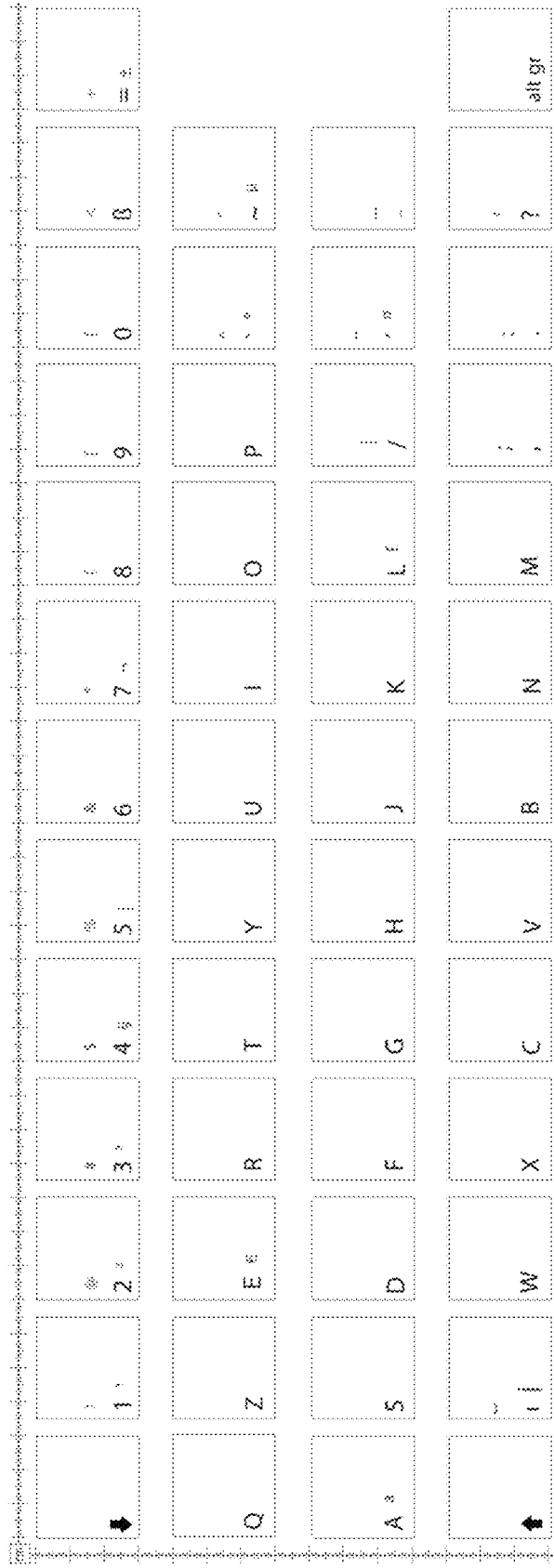
FIG. 3 is another perspective view of a European keyboard system according to the present invention, shown installed upon a conventional personal computer. In the above left-hand corner, the key with the downward facing arrow representing the upside-down shift key.
Figure 6A:
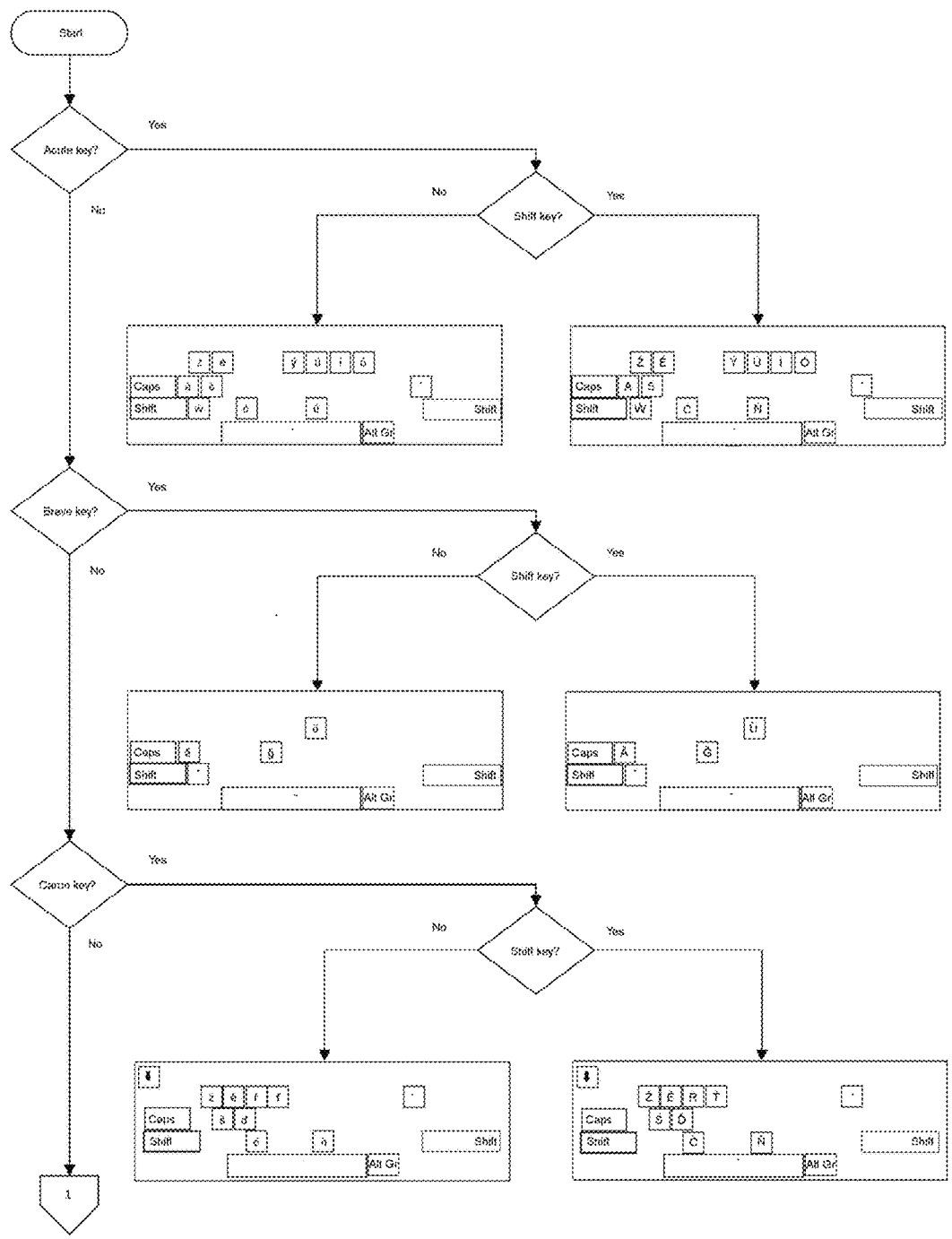
FIGS. 6A-6D are flow diagrams illustrating the operation of an exemplary keyboard of the invention.
Figure 6B:
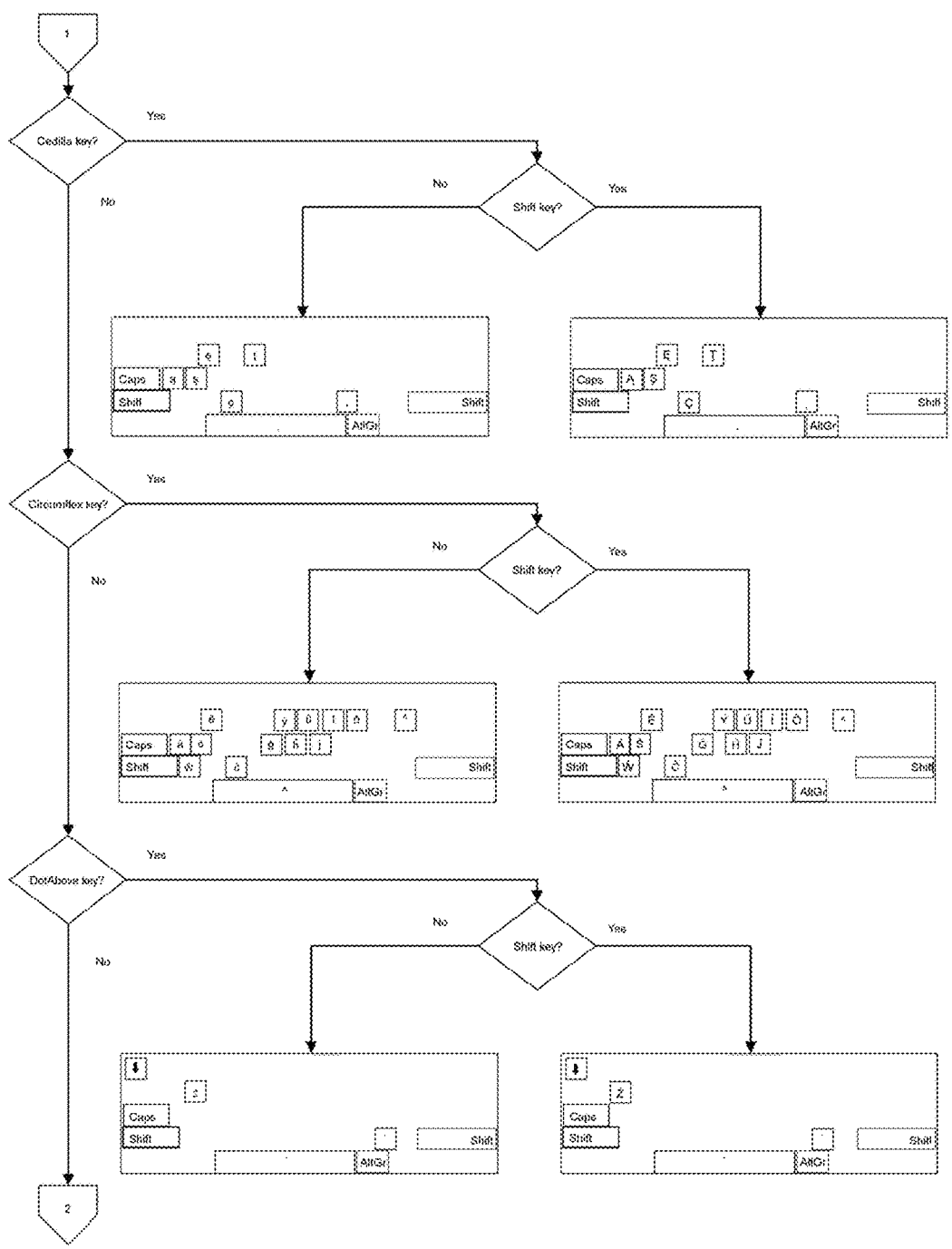
Figure 6C:
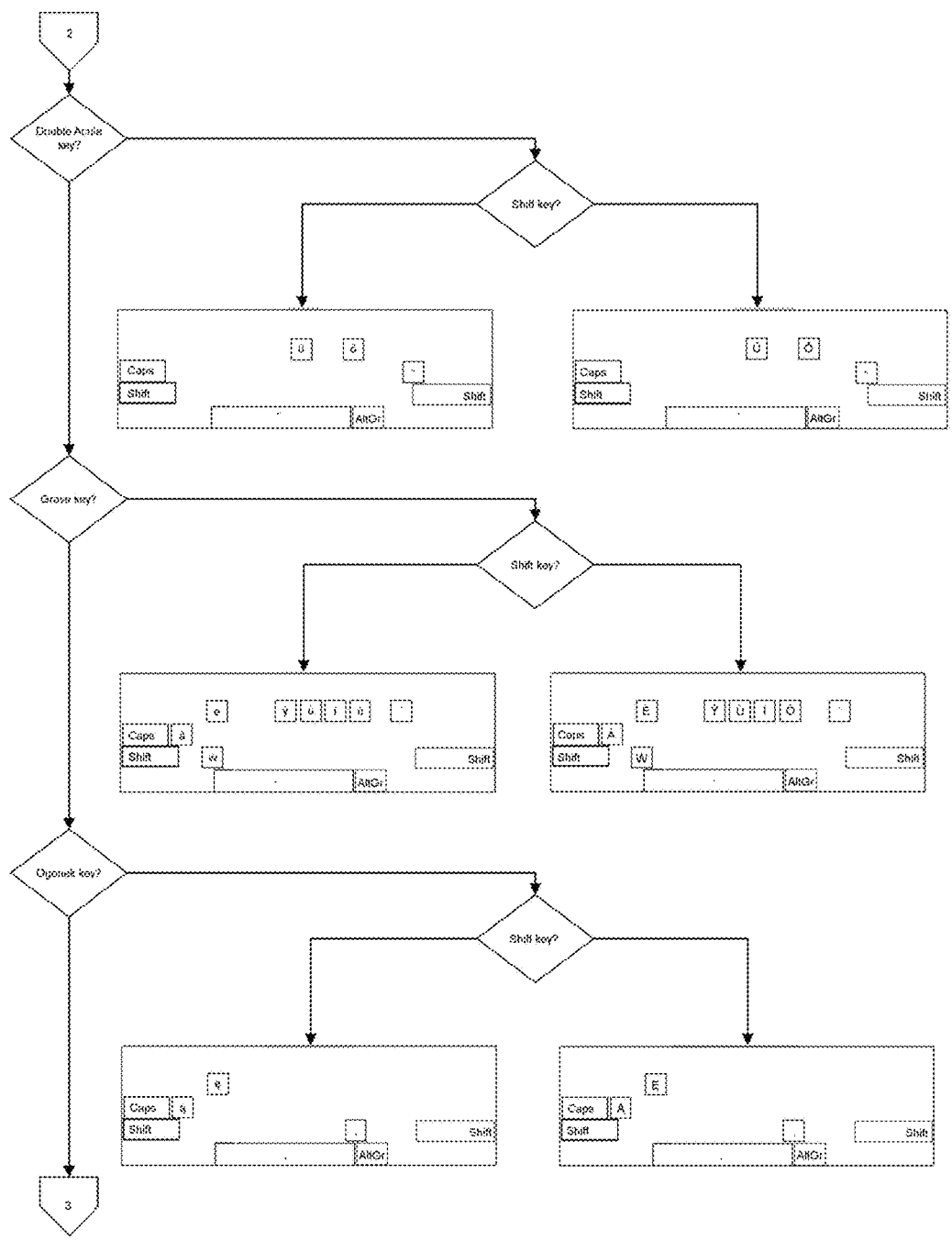
Figure 6D:
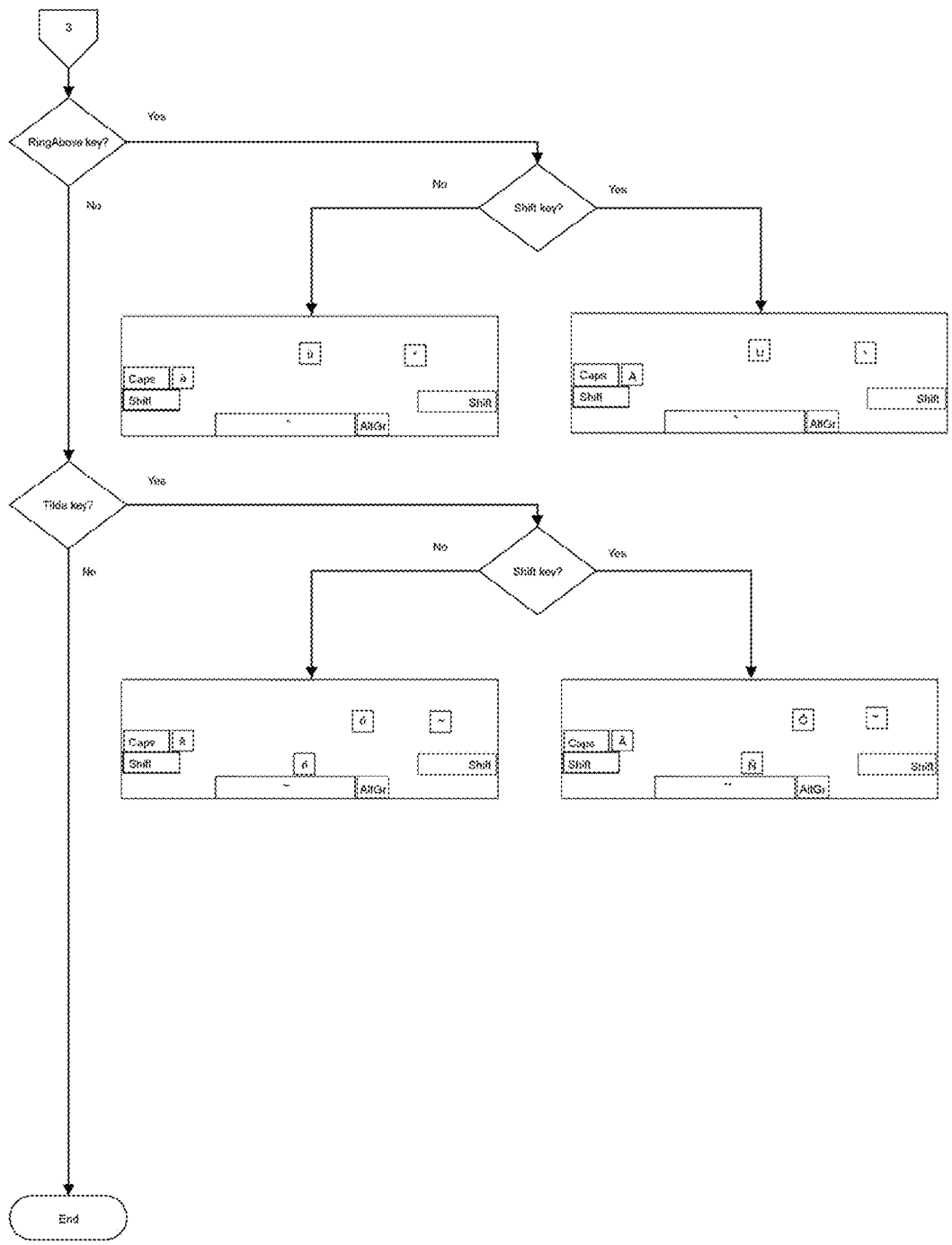
Figure 8:
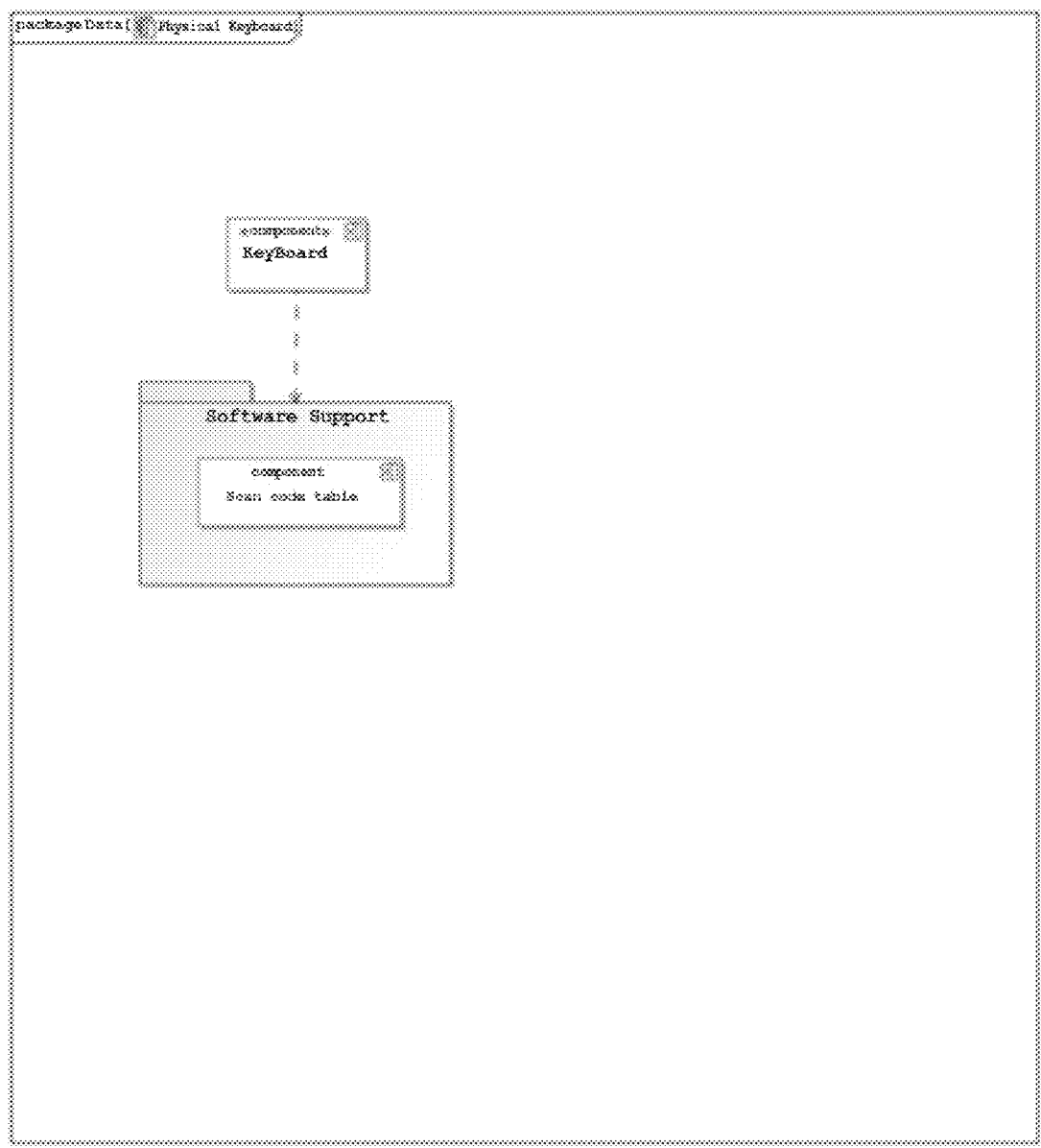
FIG. 8 illustrates the present invention installed on a personal computer. Two components allow for communication between the keyboard and the computer: the scan code table and the dialog box software. Filters in the dialog box remove characters based on the choices of language made by the user. This renders the keyboard highly adaptable.
Figure 9:
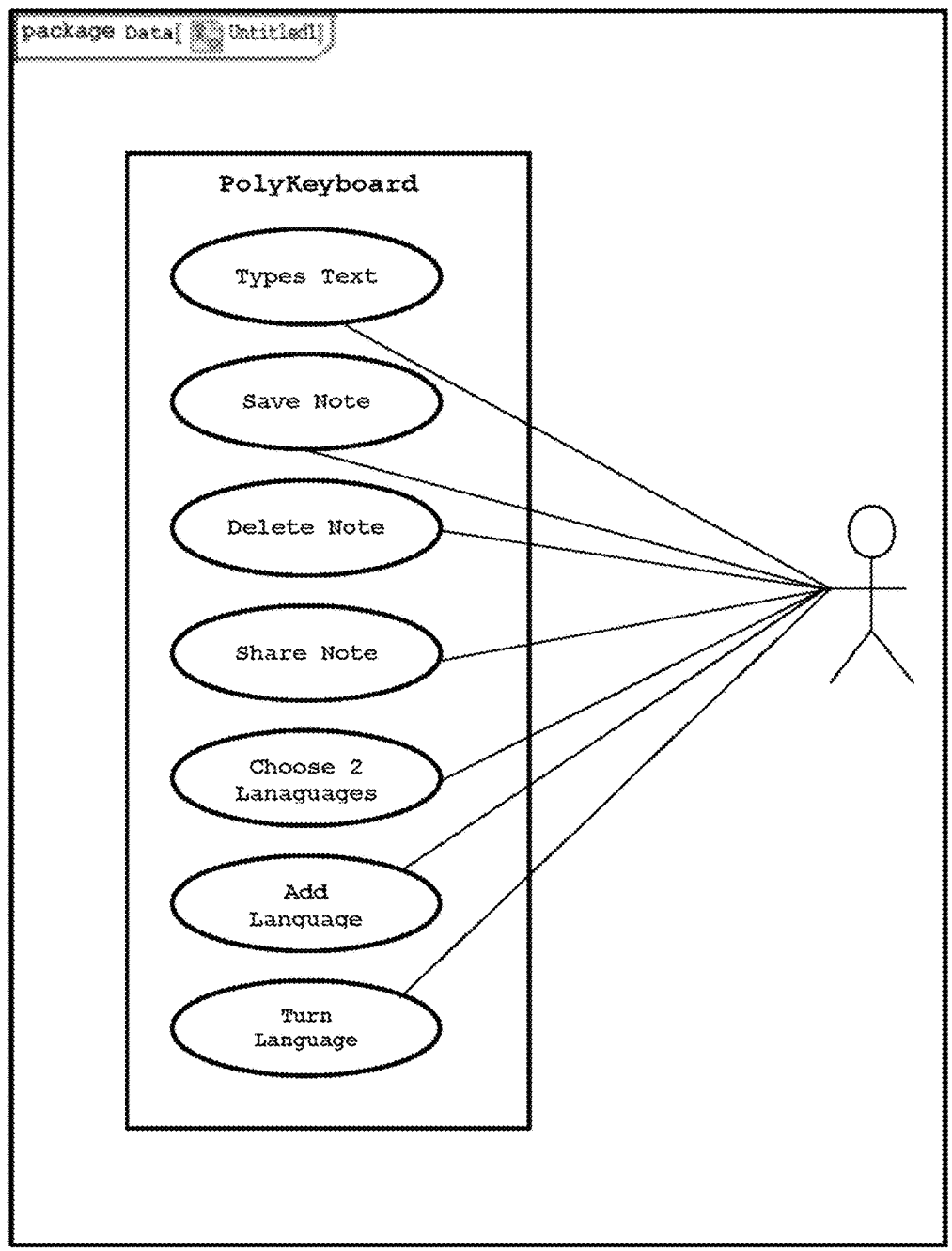
FIG. 9 illustrates the present invention installed on a tablet/mobile device. Upon downloading the application, the user can choose 2 languages for free, purchase additional languages (15+), and turn those languages on and off in the dialog box. Filters in the dialog box remove characters based on the choices of language made by the user. The multilingual keyboard application allows the user to type text into a notepad, which the user can then save, delete and share across social media channels.
Figure 10:
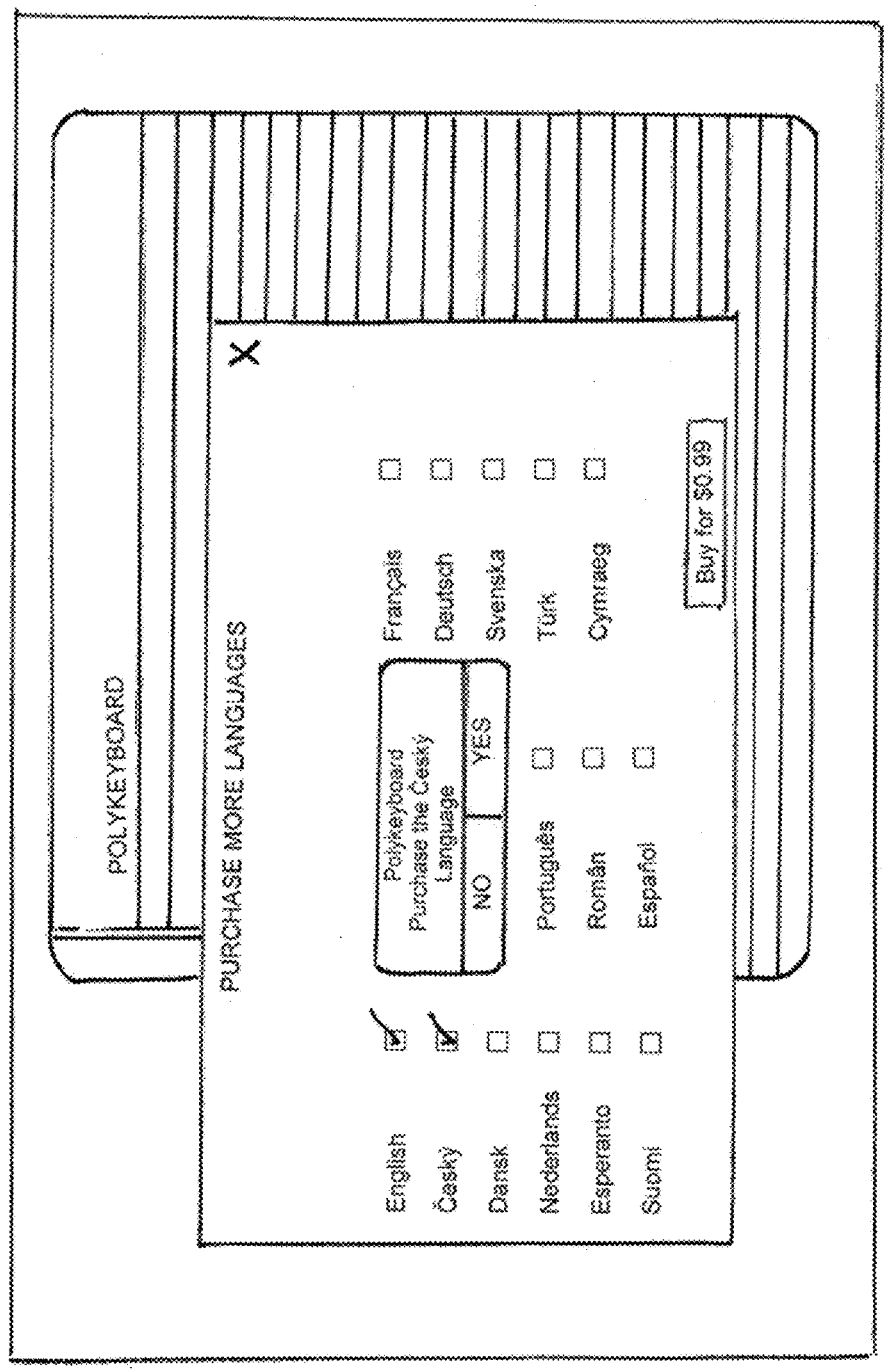
FIG. 10 illustrates the present invention installed on a mobile device/smart phone. Because smart phone screens are significantly smaller than tablet screens, in one embodiment the invention provides a unique numeric keypad for the 'portrait view' of the device. The numeric keypad will appear when the mobile phone is held vertically. The full keyboard layout will appear only when held horizontally (landscape view). When the user holds a finger down on one of the buttons, they can then slide it up and select a 'green' character (above).
Figure 12:
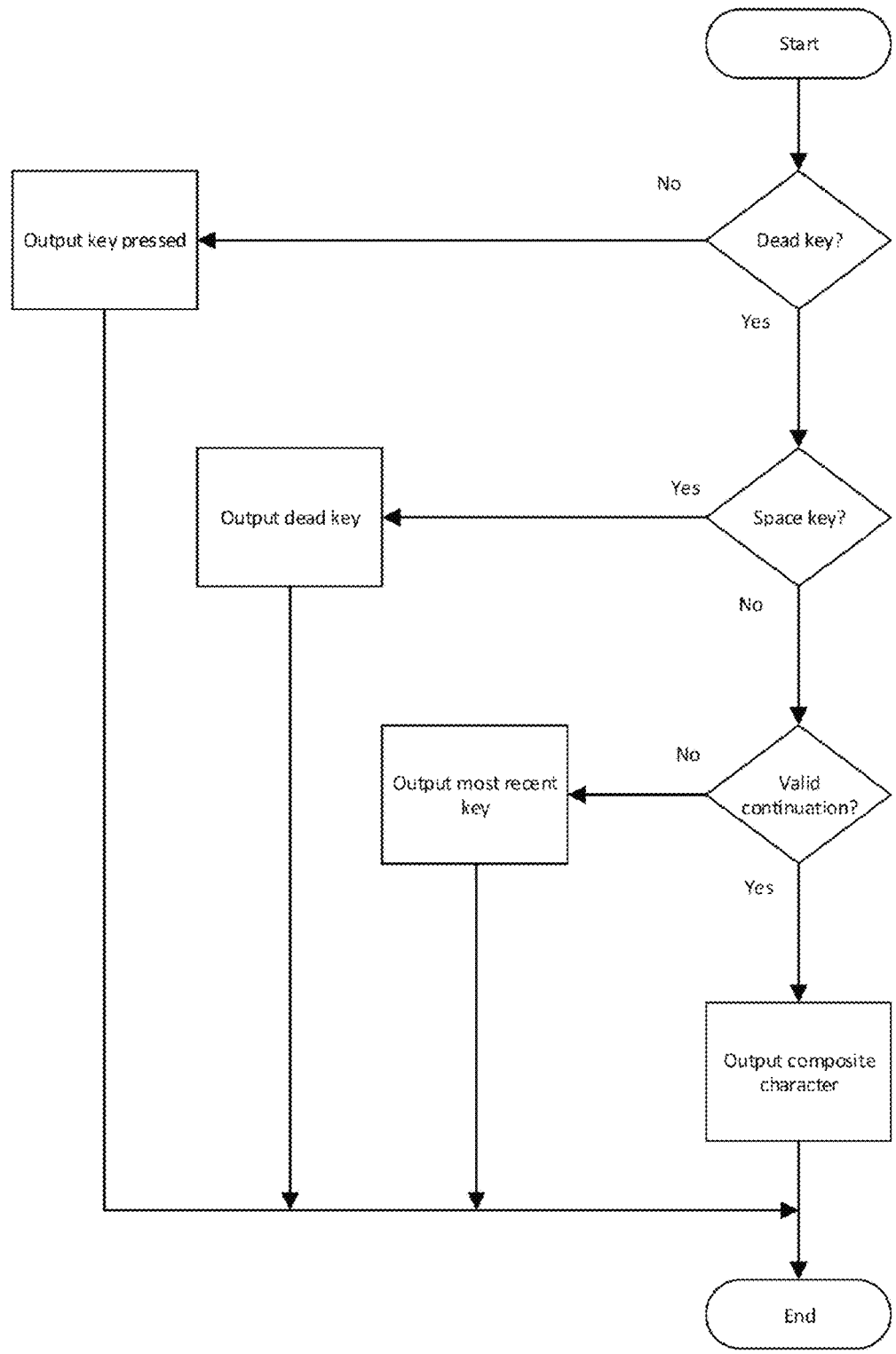
FIG. 12 describes the way the mulitilingual keyboard behaves when implementing 'dead keys'.
Figure 13:
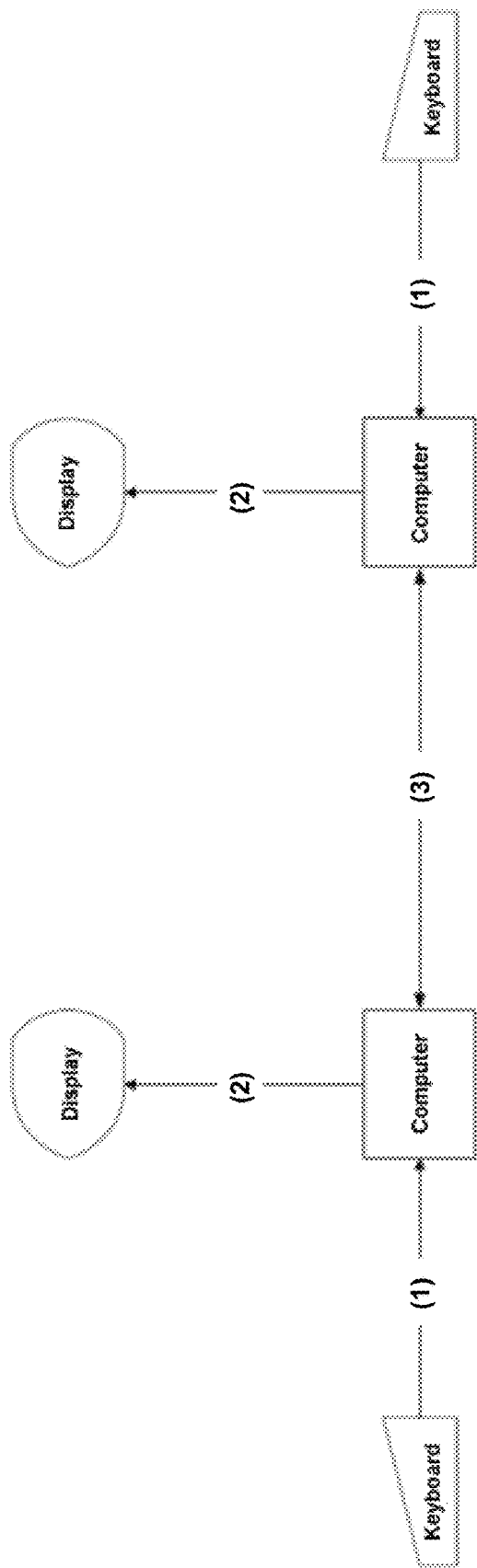

FIG. 13. To prevent eavesdropping, data is encrypted before sending along a communication line and decrypted after receiving. Three types of communication lines:

(1) Keyboard to computer;

(2) Computer to display; and (3) Computer to computer (bidirectional).

Encryption helps turn an insecure communication line into a secure one.

Eavesdropping Devices:

Key logger (keeps a log of every key press received by the computer).

Video splitter/recorder.

Network listener. Taps into the networks computers use for communication (LAN, Internet). Intercepts and copies data packets.

DETAILED DESCRIPTION OF THE INVENTION

I. Introduction

Commonly used keyboards and other input devices that enable the input of text characters when using a computerized system, such as a keypad, for example, usually include one or more characters permanently printed upon each key. For example, each key may comprise one or more letters, one or more numbers and/or one or more punctuation marks and/or command symbols.

The presentation design printed or attached to each press key is often limited to a maximum of two characters of two languages (e.g. English Latin characters and Hebrew characters, where each of the letter representing keys include two letters—one of each language. This creates a tremendous limitation both to the user and to the manufacturer.

To switch from one language to another, the user is often required to define the language through his computer program presentation. While the software industry provides support for multiple input languages (far more than just the two enabled by a single keyboard), if the user wishes to use more than two languages he is required to switch between several keyboards.

Additionally, the double presentation of two characters of two different languages over the same key of the keyboard can be confusing for typing, requiring the user only to refer to the character of the key associated with the currently used language.

Definitions

The following definitions and explanations provide background information pertaining to the technical field of the present invention, and are intended to facilitate the understanding of the present invention without limiting its scope:

As employed herein, the term "number" shall mean one or an integer greater than one (i.e., a plurality).

As employed herein, the term "processor" means a programmable analog and/or digital device that can store, retrieve, and process data; a computer; a workstation; a personal computer; a microprocessor; a microcontroller; a microcomputer; a central processing unit; a mainframe computer; a mini-computer; a server; a networked processor; or any suitable processing device or apparatus.

As employed herein, the term "characters" means letters, digits, symbols and the like and can additionally include ideographic characters, components thereof, and the like.

As employed herein, the term "mark" means a displayed symbol (e.g., without limitation, as is employed for punctuation or pronunciation).

As employed herein, the terms "diacritical mark" and "diacritic" mean a mark added to a letter or other character to indicate a special pronunciation, or a mark near or through an orthographic, phonetic or other character, or a combination of characters, indicating a phonetic value different from that given to an unmarked or otherwise marked element. Some non-limiting examples of diacritical marks and diacritics include: (1) an accent or accent mark (e.g., "'" placed above the letter "e", thus "é", to provide an acute accent; "`" placed above the letter "e", thus "è", to provide a grave accent), which is a diacritical mark used to indicate stress or placed above a vowel to indicate a special pronunciation; (2) breve, which is a diacritical mark (e.g., U-shaped) placed over a vowel to indicate a relatively short sound; (3) cedilla, which is a diacritical mark (e.g., ",") placed below the letter "c" to indicate that it is pronounced as an "s"; (4) circumflex, a diacritical mark (e.g., "^") placed above a vowel in some languages to indicate a special phonetic quality; (5) hacek or wedge (e.g., V-shaped), which are diacritical marks (e.g., an inverted circumflex) placed above certain letters (e.g., the letter "c") to indicate pronunciation; (6) macron, which is a diacritical mark (e.g., "¯") placed above a vowel to indicate a relatively long sound; (7) tilde, which is a diacritical mark (e.g., "~") placed over the letter "n" in Spanish to indicate a palatal nasal sound or over a vowel in Portuguese to indicate nasalization; and (8) umlaut, dieresis, or diaeresis, which are diacritical marks (e.g., two dots or "¨") placed over a vowel in German to indicate a change in sound.

As employed herein, the term "reduced keypad" means a keypad or other suitable keyboard in which multiple letters, symbols, and/or digits, and the like, are assigned to any given key. For example and without limitation, a touch-tone telephone includes a reduced keypad by providing twelve keys, of which ten have digits thereon, and of these ten keys eight have Latin letters assigned thereto. For instance, one of the keys includes the digit "2" as well as the letters "A", "B", and "C". Other known reduced keypads have included other arrangements of keys, letters, symbols, digits, and the like. Since a single actuation of such a key potentially could be intended by the user to refer to any of the letters "A", "B", and "C", and potentially could also be intended to refer to the digit "2", the input generally is an ambiguous input and is in need of some type of disambiguation in order to be useful for text entry purposes.

As employed herein, the term "full keypad" means a keypad or other suitable keyboard in which plural letters are not assigned to any given key. Optionally, some of the other keys may have multiple symbols and/or digits, and the like, assigned to each of those other keys.

As employed herein the term "touchpad" means an input apparatus structured using any suitable technology to determine the location of a user's finger (e.g., without limitation, X_Finger, Y_Finger) with respect to two axes (e.g., without limitation, a horizontal axis and a vertical axis; an X axis and a Y axis) of a planar or generally planar surface.

A "dialogue box" is a type of window used to enable reciprocal communication or "dialogue" between a computer and its user. It may communicate information to the user, prompt the user for a response, or both. A dialog box is most often used to provide the user with the means for specifying how to implement a command, or to respond to a question or an "alert".

An "inverse shift key" transposes the character to which it is applied through a vertical axis, effectively flipping the character through a range of angles, for example, 90°, 180° or 270° based on the number of times the key is pushed. In various embodiments, the keyboard of the invention includes more than one inverse shift key, each of which rotates a character through an angle selected from 90°, 180° or 270°. For example, a single press of the inverse shift key in conjunction with the parenthesis key rotates the parenthesis through 90°, while two presses rotate it through 180°, closing the parenthesis. In another embodiment, the degree of rotation effectuated by the inverse shift key is modulated by a second key, such as the right click on a mouse. Thus, in one embodiment, a single press of the inverse shift key rotates a character through 90°, while a single press of the inverse shift key coupled with a right click on a mouse rotates the character through 180°. Other variations of this concept of the invention will be apparent to those of skill in the art.

"User defined language specific diacritical characters" refers to a set of language specific diacritical characters relevant to a language or to multiple languages the user intends to use in conjunction with the systems, devices, methods and programs of the invention. These characters can include all language specific diacritical characters for a particular language or a subset of such characters.

In the above description, an embodiment is an example or implementation of the inventions. The various appearances of "one embodiment," "an embodiment" or "some embodiments" do not necessarily all refer to the same embodiments.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Meanings of technical and scientific terms used herein are to be commonly understood as by one of ordinary skill in the art to which the invention belongs, unless otherwise defined.

It is to be understood that the phraseology and terminology employed herein is not to be construed as limiting and are for descriptive purpose only.

The Embodiments

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

The present invention may be implemented in the testing or practice with methods and materials equivalent or similar to those described herein.

According to one aspect of the invention, there is provided a method, a computer executable code, a device and a system for adapting a keyboard display to a definable input language. The system may comprise: an adaptable keyboard comprising keys; a software application, operatively associated with the adaptable keyboard; and a computerized system enabling to receive data from the adaptable keyboard, process and present data and operate the application, where the computerized system enables operating the software application and is operatively associated with the adaptable keyboard.

Thus, in an exemplary embodiment, the invention provides a method of generating a plurality of language specific diacritic characters for languages using a single layout for a character entry device. The method comprises monitoring the character entry device for a plurality of concurrent selection events wherein the selection events comprise at least a first selection event and a second selection event, wherein the first event is a character inversion event (e.g., deploying the inverse shift key); determining whether the first selection event and the second selection event in combination comprise a first language specific diacritic character, and emitting the first language specific diacritic character.

In various embodiments, determining whether the first selection event and the second selection event in combination comprise a first language specific diacritic character comprises comparing the character resulting from said first selection event and said second selection event with a table of language specific diacritic characters. In operation, the comparing is performed by the computer. The table of language specific diacritic characters is optionally input or selected by the operator. In an exemplary embodiment, the table of language specific diacritic characters is limited to the characters relevant to the language selected by the operator. In an exemplary embodiment, the table of language specific diacritic characters is limited to those characters input by the operator. The keyboard includes all symbols and diacritics by default. If the operator chooses, he'll/she'll have the option of specifying his/her language combinations in his/her settings. The rest is described in the features of the dialog box.

In various embodiments, the entry device is selected from a keyboard and a touchpad such as those found on a cellular telephone or a tablet. At least some of the character keys of the entry device are language adaptable by concurrent deployment of the character input key and the inverse shift key.

In some embodiments, it is convenient for the operator to work with an entry device that includes markings on the adaptable character keys indicating their adaptable identity(ies). Various options are available for marking the keys including replaceable keys, programming the appearance on the keys of an electronic entry device, and removeable printed stickers adhered to the existing keys of a standard keyboard.

An software application enables defining a language and adapting the presentation of each character in a display screen according to the defined language, by controlling the display in the screen. In an exemplary embodiment, the characters are displayed in a dialogue box.

In various embodiments, the invention provides a computer program having executable instruction codes for generating language specific diacritics for a plurality of languages using a single layout for a character entry device. The program includes a first set of instruction codes for monitoring the character entry device for a plurality of concurrent selection events wherein the selection events comprise at least a first selection event and a second selection event, wherein said first selection event is a character inversion event (e.g., deploying the inverse shift key); a second set of instruction codes for determining whether the first selection event and the second selection event in combination comprise a first language specific diacritic character, and a third set of instruction codes for emitting the first language specific diacritic character.

In an exemplary embodiment, the program further comprises a fourth set of instruction codes for user input of a first language specific diacritic character mapped to the first selection event and the second selection event.

In various embodiments, the program further includes a fifth set of instructions coded for displaying the user input in a dialogue box.

According to another aspect of the invention, there is provided an adaptable character entry device (e.g., keyboard) for adapting character entry and display to a definable input language. An exemplary device includes keys, where at least some of the keys or points on a touchscreen of the adaptable entry device that are language adaptable through the concurrent deployment of the character input key and the inverse shift key.

Thus, in an exemplary embodiment, the invention provides a character entry device for generating language specific diacritics for a plurality of languages using a single layout. The device comprises a means for monitoring the character entry device for a plurality of concurrent selection events wherein the selection events comprise at least a first selection event and a second selection event, wherein the first selection event is a character inversion event; means for determining whether the first selection event and the second selection event in combination comprise a first language specific diacritic character, and means for emitting the first language specific diacritic character.

In an exemplary embodiment, the entry device is a standard keyboard with one additional key, the inverse shift key. This key is located at any position convenient on the keyboard. In an exemplary embodiment, the keyboard includes a standard number of keys, e.g., U.S. keyboards have 101 keys traditionally; European keyboards have 102. The keyboard of the present invention has 102 keys.

In an exemplary embodiment, the entry device of the invention further includes a means to map the first selection event and the second selection event to a language specific diacritic which is displayed in a dialogue box.

The present invention, in some embodiments thereof, provides a system for adapting an entry device to enter a definable input language, to allow a user to select a language for typing and view characters relating to the selected language when using the keyboard for typing.

Thus, in various embodiments, there is provided a system for adapting an entry device (e.g., keyboard) to enter a definable input language, the system comprising an adaptable entry device comprising keys or points on touchscreen corresponding to characters; a software application, operatively associated with the adaptable entry device; and a computerized system enabled to receive data from the adaptable entry device, process and present data and operate the application. The adaptable entry device includes an inverse shift key configured to invert a character corresponding to a key struck concurrently with the inverse shift key, or these two regions on a touchscreen contacted concurrently.

In various systems of the invention, the software application includes a user interface, enabling users to select a language for entry device presentation; and a display control module for controlling the presentation of the keys of the entry device, by adapting the characters presented by at least some of the keys to represent characters utilized in the selected language.

In various embodiments, the software application further includes a languages module enabling the user to define a languages list for presentation and add or remove languages from the languages list.

In an exemplary embodiment, the languages module further enables retrieving languages data from at least one data source for adding new languages to the list; defining graphical parameters of the characters of each language; and storing the languages' characters and parameters in at least one database, and wherein the interface allows the users to select a language for presentation from the languages list and the display control module enables presenting characters of the selected language according to the defined characters graphical parameters of the selected language by retrieving data from the database. Exemplary graphical parameters include a font, a color, highlighting, italicizing and bolding. Other graphical parameters of use will be apparent to those of skill in the art.

The characters on the keys may be, for example, letters, numbers or punctuation marks. Each language may have different letters and symbols that are inverted by the inverse shift key. The system allows adapting each character to the language at use by changing the characters that defer from the previously used language.

Some languages have more letters than others requiring fewer keys to be used to create language specific diacritical characters, where each language may have a different number of punctuation marks and other symbols used when writing text. The system enables transforming the presentation of the keys according to all the characters (symbols) required for the selected language.

In various embodiments, the methods, systems and devices of the invention are applicable to languages selected from English, French, German, Dutch, Luxembourgish, Spanish, Italian, Portugese, Swedish, Danish, Hungarian, Czech, Esperanto, Finnish, Romanian, Turkish, Welsh and Polish.

In another aspect of the invention, the system includes a screen display through which a computer user may interact with the system to customize the operation of the system. The display is optionally in the form of a dialogue box.

In various embodiments, the dialogue box allows users of the present invention to moderate symbols of the unified languages in order to facilitate multilingual typing. The user can turn symbols on or off, based on their choice of language or on the individual symbols themselves. These changes are optionally applicable at all times, without having to restart the software. Furthermore, users will be able to save settings and name them, in order to conserve their preferred choices. Touch typing in several languages will be more natural and accessible than it ever has been.

Also provided in an exemplary embodiment is an iOS application displaying the input component, including the plurality of input members, which are characters on a standard keyboard, and an inverse shift key. The invention encompasses the application as well as its use, devices onto which the application is loaded and the use of such devices to enter text including one or more language specific diacritical characters.

EXAMPLES

Example 1

See, attached FIGS. 1-7.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

What is claimed is:

1. A method of generating a plurality of language specific diacritic characters for a plurality of Latin-based languages or languages based on a Roman character set using a single layout for an adaptable character entry device comprising an inverse shift key, wherein said plurality of language specific diacritical characters is limited to a set of said language specific diacritical characters characteristic of a language selected by an operator of the entry device, comprising: monitoring by a processor the character entry device for a plurality of concurrent selection events, wherein the selection events comprise at least a first selection event, a second selection event, and a third selection event, wherein said first selection event is a character inversion event; determining by the processor whether the first selection event, the second selection event, and the third selection event in combination comprise a first language specific diacritic character; and generating by the processor the first language specific diacritic character.

2. The method of claim 1, wherein the character entry device comprises a keyboard.

3. The method of claim 2, wherein the keyboard comprises a plurality of keys that are marked with available diacritical characters.

4. The method of claim 3, wherein the keys are removeably marked with a printed sticker.

5. The method of claim 2, wherein the keyboard lacks one or more keys that are marked with a punctuation character selected from the group consisting of a closing parenthesis character, a closing curly bracket character, a closing square bracket character, a closing angle bracket character, an inverted exclamation point, and an inverted question mark.

6. The method of claim 1, wherein determining whether the first selection event, the second selection event, and the third selection event in combination comprise a first language specific diacritic character comprises comparing the character resulting from said first selection event, said second selection event, and said third selection event with a table of language specific diacritic characters.

7. The method of claim 6, wherein said table of language specific diacritic characters comprises data input by a user of the method, and that characters are displayed in a dialogue box.

8. A non-transitory computer readable medium storing a computer program product having executable instruction codes for generating language specific diacritics for a plurality of Latin-based languages or languages based on a Roman character set using a single layout for an adaptable character entry device comprising an inverse shift key, comprising: a first set of instruction codes for monitoring the character entry device for a plurality of concurrent selection events wherein the selection events comprise at least a first selection event, a second selection event, and a third selection event, wherein said first selection event is a character inversion event; a second set of instruction codes for determining whether the first selection event, the second selection event, and a third selection event in combination comprise a first language specific diacritic character, and a third set of instruction codes for generating the first language specific diacritic character.

9. The non-transitory computer readable medium storing the computer program product of claim 8, further comprising a fourth set of instruction codes for user input of a first language specific diacritic character mapped to the first selection event, the second selection event, and the third selection event.

10. The non-transitory computer readable medium storing the computer program product of claim 9, further comprising a fifth set of instruction coded for displaying the user input in a dialogue box.

11. The non-transitory computer readable medium storing the computer program product of claim 8, wherein the adaptable character entry device lacks one or more punctuation character keys selected from the group consisting of a closing parenthesis character, a closing curly bracket character, a closing square bracket character, a closing angle bracket character, an inverted exclamation point, and an inverted question mark.

* * * * *